US008764259B2

(12) United States Patent
Schug

(10) Patent No.: US 8,764,259 B2
(45) Date of Patent: Jul. 1, 2014

(54) AUTOMOTIVE HEADLAMP WITH ACTUATED ROTATABLE COLLIMATOR

(75) Inventor: Josef J. Schug, Wuerselen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 325 days.

(21) Appl. No.: 13/142,867

(22) PCT Filed: Dec. 22, 2009

(86) PCT No.: PCT/IB2009/055901
§ 371 (c)(1),
(2), (4) Date: Jun. 30, 2011

(87) PCT Pub. No.: WO2010/076741
PCT Pub. Date: Jul. 8, 2010

(65) Prior Publication Data
US 2012/0026746 A1 Feb. 2, 2012

(30) Foreign Application Priority Data
Jan. 5, 2009 (EP) .................................... 09150045

(51) Int. Cl.
*B60Q 1/06* (2006.01)

(52) U.S. Cl.
USPC ........... 362/538; 362/512; 362/545; 362/282; 362/284; 362/555

(58) Field of Classification Search
USPC ......... 362/512, 594, 538, 545, 277, 278, 282, 362/283, 284, 310, 555
See application file for complete search history.

(56) References Cited

U.S. PATENT DOCUMENTS

| | | | | | |
|---|---|---|---|---|---|
| 959,205 | A * | 5/1910 | D'Olier, Jr. | ................... | 362/282 |
| 1,162,646 | A * | 11/1915 | Porter | ........................... | 362/512 |
| 1,505,654 | A * | 8/1924 | MacBeth | ...................... | 362/282 |
| 1,751,011 | A * | 3/1930 | Martin, Jr. | .................... | 362/282 |
| 3,939,339 | A * | 2/1976 | Alphen | ......................... | 362/467 |
| 4,075,469 | A * | 2/1978 | Alphen | ......................... | 362/467 |
| 4,298,912 | A * | 11/1981 | Dearth | .......................... | 362/490 |
| 5,060,120 | A | 10/1991 | Kobayashi et al. | | |
| 5,426,571 | A * | 6/1995 | Jones | ............................ | 362/466 |
| 7,093,959 | B2 * | 8/2006 | Tsao | ............................. | 362/277 |
| 7,775,679 | B2 * | 8/2010 | Thrailkill et al. | ............. | 362/237 |
| 8,025,426 | B2 * | 9/2011 | Mundle et al. | ................ | 362/281 |
| 8,061,868 | B2 * | 11/2011 | Dubord | ......................... | 362/232 |

(Continued)

FOREIGN PATENT DOCUMENTS

| | | | |
|---|---|---|---|
| DE | 4418135 | B4 | 11/1995 |
| DE | 10260397 | A | 7/2004 |

(Continued)

*Primary Examiner* — Ismael Negron

(57) ABSTRACT

A lighting assembly including a semiconductor light source, a support with a recess within which the semiconductor light source is positioned, and a collimator having light entry and light exit openings joined together by at least one side wall. The collimator is moveable relative to the support. The collimator is attached to the support such that the light entry opening of the collimator and the recess are joined in a nested manner so that light emitted by the semiconductor light source within the recess enters the collimator through the light entry opening and exits essentially only through the light exit opening of the collimator for any position of the collimator over its range of motion. The lighting assembly further includes an actuator for moving the collimator over at least part of its range of motion. An automotive headlamp arrangement includes the lighting assembly, a reflector element and a secondary optic.

14 Claims, 6 Drawing Sheets

(56) References Cited

U.S. PATENT DOCUMENTS

| | | | | |
|---|---|---|---|---|
| 8,096,670 | B2 * | 1/2012 | Trott et al. | 362/147 |
| 2007/0291502 | A1 * | 12/2007 | Takada et al. | 362/514 |
| 2011/0164422 | A1 * | 7/2011 | Chan | 362/284 |
| 2012/0002435 | A1 * | 1/2012 | Van Gorkom et al. | 362/551 |
| 2012/0327676 | A1 * | 12/2012 | Schug | 362/507 |

FOREIGN PATENT DOCUMENTS

| | | | |
|---|---|---|---|
| WO | 2006033040 | A2 | 3/2006 |
| WO | 2006033042 | A1 | 3/2006 |
| WO | 2006054225 | A1 | 5/2006 |
| WO | 2008035267 | A2 | 3/2008 |

* cited by examiner

AUTOMOTIVE HEADLAMP WITH ACTUATED ROTATABLE COLLIMATOR

FIELD OF THE INVENTION

The invention describes a lighting assembly.

BACKGROUND OF THE INVENTION

Lighting units or lighting assemblies using semiconductor light sources are becoming more popular as advances in technology have led to economic and yet very bright semiconductor light sources.

In lighting assemblies used for example in automotive applications, a particular requirement is that the bright dark cut-off line of the light output by the lighting assembly satisfies certain regulations. Furthermore, this bright dark cutoff line should be adaptable, for example to raise or lower the beam of light output by the lighting assembly. Adaptability of the light output is also desirable in particular situations, such as when driving into a bend, so that the area in the bend can be better illuminated, with a resulting increase in promote safety.

Prior art lighting assemblies are known, which implement a movable beam limiter to direct the light output to alter the bright/dark cut-off lines, for example in an up or down direction. However, these solutions have the disadvantage that some of the light 'escapes' when the beam limiter is moved, so that not all of the light emitted by the light source is able to enter the beam limiter, thereby resulting in a lower efficiency of these types of lighting assembly.

Therefore, it is an object of the invention to provide an alternative, and more efficient, lighting assembly.

SUMMARY OF THE INVENTION

The object of the invention is achieved by the lighting assembly according to claim 1.

The lighting assembly comprises a semiconductor light source; a support with a recess, within which recess the semiconductor light source is positioned; and a collimator comprising a light entry opening, a light exit opening, and at least one side wall, which collimator is movable, relative to the support, within a range of motion. According to the invention, the collimator is attached to the support such that the light entry opening of the collimator and the recess are joined in a nested manner so that light emitted by the semiconductor light source within the recess enters the collimator through its light entry opening and exits essentially only through the light exit opening of collimator for any position of the collimator over its range of motion. The lighting assembly further comprises an actuator for moving the collimator over at least part of its range of motion.

The semiconductor light source used in the lighting assembly can be a light-emitting diode (LED), an organic LED (OLED), a laser diode, or any other suitable semiconductor light source. Such a semiconductor light source is generally attached to a substrate, as will be known to the skilled person familiar with the methods of manufacture of such semiconductor light sources. The necessary electrical connections for activating and driving the light source are usually integrated in the substrate. The quality or integrity of the surface of such a semiconductor light source is crucial to its light-emitting performance. Care must be taken to avoid scratches or other damage to the light source. A conventional semiconductor lighting arrangements can be protected by an encapsulant, a dome or a cover glass. However, access to the light source, which may be desirable in some optical concepts, is made difficult by these protective coverings. Therefore, to prevent damage to the semiconductor light source or the substrate, these may be protected by a cover with an opening or aperture to match the position of the semiconductor light source on the substrate. Generally, the aperture corresponds in shape to the shape of the light source. In the lighting assembly according to the invention, the cover not only serves a protective purpose, but also serves as a support for the collimator, as will become evident from the following description. Moreover, the support could also be realized to enclose and hold—in the recess—the semiconductor light source as well as its substrate. Therefore, the terms 'cover' and 'support' may be used interchangeably in the following, without restricting the invention in any way.

The lighting assembly described here might be part of a lighting unit which may be required to deliver a beam of light with a certain 'shape', or 'light pattern'. The purpose of the collimator, then, is to direct the light emitted by the semiconductor light source to contribute to the ultimate shape of the beam of light delivered by such a lighting unit. The shape of the collimator itself influences to some extent the shape of the output beam of light. For this reason, the collimator is also sometimes referred to as a 'beam limiter'. These terms may therefore be used interchangeably in the following.

An obvious advantage of the lighting assembly according to the invention is that, since the collimator and cover are connected in a nested manner—i.e. one fits at least partially inside the other—light cannot 'leak out' from underneath the collimator, so that essentially no light is lost at this connection. In this way, a particularly high efficiency of the semiconductor light source can be achieved. This is particularly important for applications in which the efficiency of the light source should be as high as possible, for example for safety reasons in automotive applications. Furthermore, by avoiding a 'leakage' of light from underneath the collimator, a more precise shaping of the overall light pattern can be achieved.

The surface area of the light-emitting surface of a semiconductor light source, such as an LED chip may have dimensions in the order of 0.5 mm×0.5 mm to 2.0 mm×2.0 mm, and may be grouped in arrays. Arrays of 1×2 chips or even 4×32 chips have been shown. Arrays of 1×4 chips or 1×5 chips are quite common in automotive applications. In general, the spacing between the individual chips is quite small in order to allow the array to be regarded as a single rectangular light source. LED chips with rectangular areas can be used, so that these can be easily arranged in an overall rectangular shape with little or no gaps between the individual chips.

A semiconductor light source generating a monochromatic output light colour can be coated with a fluorescent or phosphorescent material in order to produce light of the desired colour, e.g. white light. Such a coating can also be applied to a number of chips arranged in an array, as described above.

The entire lighting assembly, even an assembly using an array of LED chips, can be advantageously small in size. Therefore, another advantage of the lighting assembly according to the invention is that, owing to the small dimensions of the components, the moving parts such as the actuator and collimator can be realized using light and easily moveable parts, so that only small forces are required to move them. For example, a small electromechanical motor such as a micro-motor can be sufficient to move the collimator over its range of motion relative to the cover.

The dependent claims and the subsequent description disclose particularly advantageous embodiments and features of the invention.

As mentioned above, the collimator is movable within a range of motion, and the collimator is moved by an actuator over its range of motion. Any suitable type of motion could be considered, for example sideways movement of the collimator over the cover of the lighting assembly. However, in a particularly preferred embodiment of the invention, the collimator is movable or tiltable about an axis of rotation, so that the collimator essentially does not depart from its overall position in relation to the cover of the lighting assembly. In this way, essentially the entire light output of the semiconductor light source can be directed through the collimator without any light leakage, regardless of the position of the collimator within its range of motion.

The emission from the LED light source normally covers a wide angular range. In a preferred embodiment of the invention, the collimator directs the light emitted by the source into a narrower angular range. Since the overall area of a semiconductor light source is generally quite small, but the brightness of such a semiconductor light source is quite high, it is generally desirable to spread and, to some extent, to shape the light emitted by the light source. Therefore, in a particularly preferred embodiment of the invention, the area of the light entry opening of the collimator is less than the area of the light exit opening of the collimator. Thereby, the relative positions of the light entry opening and the light exit opening are such that the output light is directed in a particular direction.

The dimensions of a semiconductor light source are generally governed by factors such as manufacturability of the light source and/or focal length of the optical system. Therefore, the area of the light entry opening of the collimator, in a preferred embodiment of the invention, is preferably less than 120 $mm^2$ (e.g. 4 mm×30 mm), more preferably less than 12 $mm^2$ (e.g. 2 mm×6 mm), and most preferably less than 6.75 $mm^2$ (e.g. 1.5 mm×4.5 mm). Because of its small size, a collimator of these dimensions may be referred to as a "micro-collimator".

As already indicated above, it is of course desirable to maintain, as far as possible, the efficiency of the semiconductor light source. Therefore, in a further preferred embodiment of the invention, the inside surface of the recess in the cover of the lighting assembly is highly reflective, which inside surface is that surface that is situated between the semiconductor light source and the light entry opening of the collimator. Such a highly reflective material can be, for example, a plastic material such as Stanyl® (manufactured by DSM) or a material coated with aluminum, silver or a titanium dioxide "filled" lacquer. However, since the light emitted by the light source leaves the aperture essentially only through the light entry opening of collimator and exits through its light exit opening, it would be sufficient for the inside walls of the recess to be highly reflective, while the remainder of the cover need not be highly reflective. This may allow, for example, for a more economical realization of the cover. To further optimize the efficiency of the lighting assembly according to the invention, one or more of the inside surfaces of the collimator are preferably highly reflective. Again, the collimator can be made using a highly reflective material, or the inside surface(s) can be treated or coated with a suitable highly reflective material.

The geometry of the recess or aperture and the geometry of the collimator or beam limiter are closely related, since these are connected in a nested manner so that one rests at least partially inside the other. In other words, the shape of the collimator determines the shape of the recess, or vice versa.

In one embodiment of the invention, therefore, the recess is formed by an enclosure, or rim, or flange located on the surface of the cover and extending outward from the surface of the cover. According to a particularly preferred embodiment of the invention, the collimator comprises an apron around its light entry opening, and the corresponding wall of the recess is shaped to accommodate the apron such that the connection of collimator and the recess is maintained during their movement of collimator over its range of motion. For example, if the recess is formed by an enclosure comprising a raised rim around the aperture, this raised rim can be realized to lean inwards at least along one edge to complement an apron of the collimator, which apron leans outwards along that edge. These shaped elements are preferably shaped to allow a smooth movement of the collimator. They may have contact with each other, and elastic properties of the material may be used to ensure that the gap between the collimator and the recess is negligible.

Evidently, the range of motion of the collimator will be governed to a large extent by the geometry of the relevant parts of the recess and collimator. In a preferred embodiment, therefore, the shape of one surface of the collimator apron and the shape of the corresponding surface of the recess comprise a curved shape, so that one of these surfaces has a convex shape and the other has a concave shape. The radius of curvature of these surfaces lies preferably in a range between 0.4 and 4 mm, more preferably between 0.5 and 2 mm, and most preferably between 0.7 and 1.5 mm. Depending on the range of adjustment desired for the bright/dark cut-off line, or the horizontal swiveling of the beam pattern, the range of motion of the collimator in such a lighting assembly lies, preferably within −45° and +45°, more preferably between −30° and +30°, and most preferably between −15° and +15° (measured relative to an imaginary axis perpendicular to the light-emitting surface of the semiconductor light source). This, in turn, governs the choice of the angular dimensions of the apron and inside wall for the tiltable type of collimator described above.

A number of different physical realizations for collimator and recess are conceivable. In one preferred realization, the recess and the light entry opening of the collimator are essentially rectangular in cross-section, and the collimator apron is shaped to extend outwards along one edge of its light entry opening. For example, for an essentially rectangular semiconductor light source, it would be most practical for the apron of the collimator to be realized along one long edge of the collimator light entry opening, and for the corresponding inside wall of the recess to be shaped accordingly. In an alternative realization, the recess is formed by an enclosure or rim protruding above the outward surface of the cover, such that the recess encloses a lower portion and apron of the collimator in a nested fashion, and is shaped along one edge complementary to the apron of the collimator so that the collimator can be tilted.

Preferably, the geometry of the collimator is such that the collimator, at its light exit opening, comprises an edge that defines the predominantly horizontal bright/dark cut-off line of the light that exits the collimator. In the 'rectangular' embodiments described above, for example, the bright/dark cut-off line could be defined by a long edge of the light exit opening, while other collimator shapes would evidently be associated with different bright/dark cut-off lines.

For example, in an alternative embodiment, the collimator might be in the shape of a truncated cone, with a circular light entry opening and an elliptical light exit opening, shaped for instance so that one point on the perimeter of the light exit opening is essentially perpendicular to the cover. The lower edge of the light entry opening of such a collimator might flare outwards over the entire perimeter of the collimator. In such a realization, a corresponding circular aperture in the cover may be realized such that an inside wall of the recess might be at a corresponding angle to accommodate the flared apron of the collimator. Alternatively, a flange or rim on the surface of the cover, surrounding a circular aperture, might be shaped to accommodate the apron of the collimator, so that the lower edge of the collimator rests upon the outer surface of the cover. Thereby, the apron of the collimator could be contained in a nested fashion within the flange or rim, or vice versa, in a manner analogous to the 'rectangular' embodiments described above.

The type of actuator used to move the collimator over its range of motion will depend largely on the geometry and dimensions of the collimator actually realized. For example, an actuator could be a 'nose' or lever to act upon a distal or 'upper' edge of the collimator, i.e. an edge along its light exit opening, so that this is tilted forward or back. Such a lever could be realized to move forward and back, being electromechanically actuated in both cases, or it may comprise a spring element so that the actuator need only be electromechanically actuated in one direction, while the spring action returns the actuator to its original position. Alternatively, the actuator may be toothed, so that the teeth of the actuator connect to corresponding teeth or depressions, for example on the outside surface of the collimator, such that when the actuator is moved, the teeth mesh in the fashion of gears, and a corresponding movement of the collimator is effected.

The actuator can also be physically connected to the collimator. In a preferred embodiment of the invention, therefore, the actuator comprises a rod connected to that edge of the light entry opening that is opposite to the apron of the collimator, which rod is rotatable about the axis of rotation to tilt the collimator about that axis. The axis of rotation essentially coincides with the edge of the light entry opening that is opposite to the apron of the collimator. In this embodiment, a rotation of the actuator directly results in a corresponding tilting movement of the collimator.

An actuator can be associated with a single collimator of a lighting assembly, or can be realized to control a plurality of collimators of neighbouring lighting assemblies. For example, in a regular arrangement of light sources, a single rod-shaped actuator of the type described above can be connected to the collimators in a row so that a rotation of the actuator causes a corresponding tilting of each of the collimators to which it is connected. In a similar manner, a toothed actuator can be realized to mesh with several neighbouring collimators, so that a movement of such an actuator causes a corresponding movement, for example a rotation, of those collimators. Naturally, the realization of the actuator is not limited to the examples given here, but can take any suitable form or dimension.

An automotive headlamp arrangement according to the invention comprises one or more lighting assemblies according to any of the embodiments described above, and also comprises a reflector element and a secondary optics to act upon the beam of light exiting the light exit opening of the collimator or beam limiter to obtain a desired light pattern. For example, one embodiment of an automotive headlamp comprises an array of lighting assemblies, laid out to give a desired overall light pattern. The actuators of each of the lighting assemblies could be individually controlled, but since this might be unnecessarily complex to realize, the actuators of the lighting assemblies could be controlled by one or more shared controllers. In a further simplification, lighting assemblies with controllable actuators could be combined in a group or distributed over several groups. The actuators of a group could then be controlled, for example, by a shared electromechanical controller that acts on the actuators of that group. Taking this one step further, the collimators of a group of lighting assemblies could be actuated by a single actuator, for example a rod connected to the long edges of a row of collimators so that a rotation of the rod causes all of these collimators to tilt synchronously. These embodiments allow for a very precise definition of the bright/dark cut-off line which can be achieved by such an automotive headlamp arrangement.

Naturally, the headlamp arrangement can comprise other light sources with fixed collimators, for example for those light sources that contribute to a part of the beam that does not contribute to any adjustments to the bright/dark cut-off line.

The lighting assemblies described above are of course not limited to use in automotive applications, but could find use in other applications such as spotlighting or for searchlights, etc. Another possible application of the lighting assembly according to the invention might be in a display arrangement for advertising or illumination purposes, in which each pixel is given by a lighting assembly of the types described above, and which can be controlled to direct the output light of each pixel in an eye-catching manner.

Other objects and features of the present invention will become apparent from the following detailed descriptions considered in conjunction with the accompanying drawings. It is to be understood, however, that the drawings are designed solely for the purposes of illustration and not as a definition of the limits of the invention.

BRIEF DESCRIPTION OF THE DRAWINGS

In the drawings, like numbers refer to like objects throughout. Objects in the diagrams are not necessarily drawn to scale.

DETAILED DESCRIPTION OF THE EMBODIMENTS

Figure 1A:
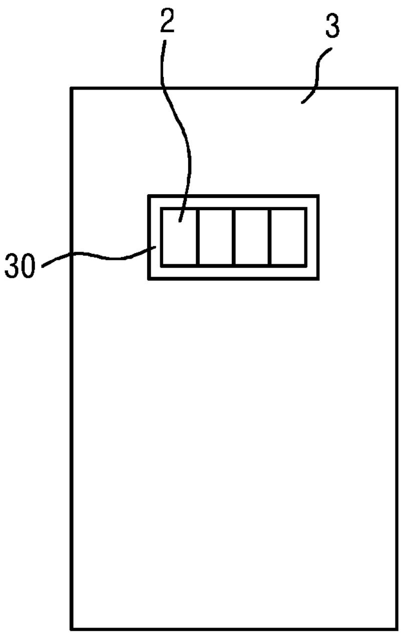
FIG. 1a Prior Art
FIG. 1*a* shows a plan view of a prior art lighting assembly with a support and a semiconductor light source.
Figure 1B:
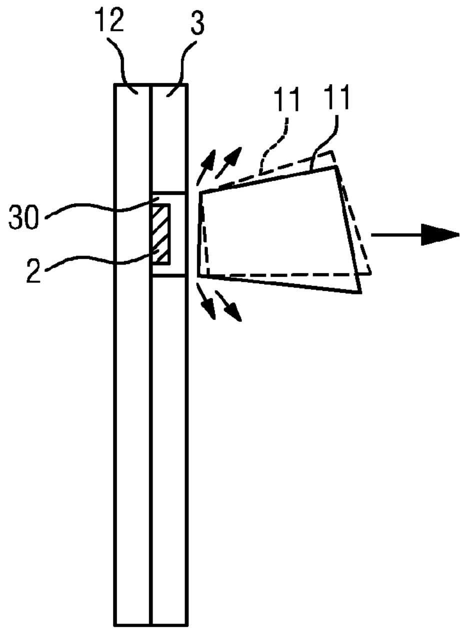
FIG. 1b Prior Art
FIG. 1*b* shows a cross-section of the prior art lighting assembly of FIG. 1*a* and a beam limiter adjacent to the lighting assembly.

FIGS. 1*a* and 1*b* show, respectively, a top view and a cross-sectional side view of a prior art lighting assembly. In these diagrams, a number of LEDs 2 is shown in a recess 30, or opening 30, in a cover 3 or support 3 protecting a substrate 12. In the cross-sectional side view, a beam limiter 11 is shown schematically, which may be moved, for example by tilting, using an actuator (not shown). By moving or tilting the beam limiter 11 from a first position (solid line) to a second position (dotted line), the bright/dark cut-off line of the light output by this prior art lighting assembly can be adjusted. Most of the light exits through the light exit opening of the beam limiter 11 (as indicated by the larger arrow), but, as already mentioned above, particularly when the beam limiter 11 is tilted or moved, some light may escape or leak (indicated by the smaller arrows) from underneath the edges of the beam limiter 11 closest to the cover 3, adversely affecting the overall shape of the output light and reducing the efficiency of the prior art lighting assembly.

Figure 2A:
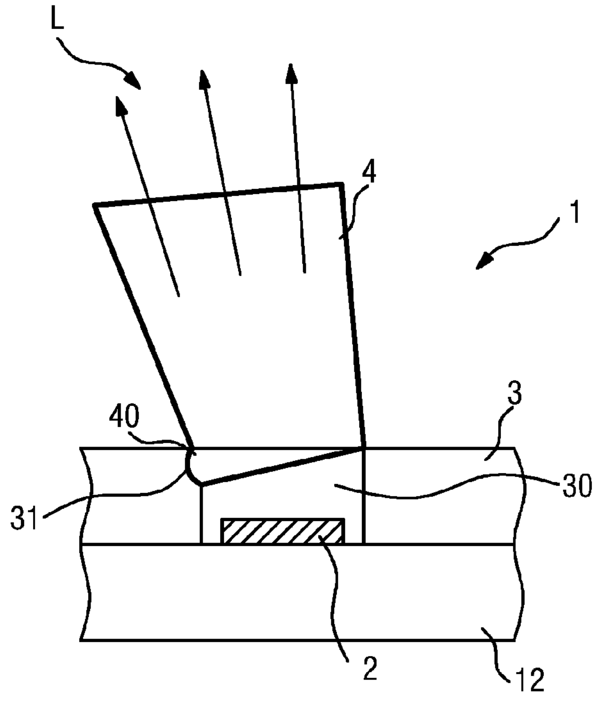
FIG. 2*a* shows a cross-section of a lighting assembly with a collimator according to a first embodiment of the present invention.

FIG. 2*a* shows a cross-sectional side view of a lighting assembly 1 according to a first embodiment of the invention. Again, a cover 3 or support 3 is attached to a substrate 12 upon which one or more LEDs 2 are arranged, such that the LEDs 2 are positioned in an opening 30 or recess 30 in the cover 3. In this embodiment, the recess 30 is simply a cut-out in the support 3. This cross-sectional side view also shows a collimator 4 which is connected to the cover 3 in a nested manner, such that, when the collimator 4 is not in a tilted position, a part 40 of the collimator 4 rests within the recess 30. In this way, a light entry opening of the collimator 4 is contained by the recess 30 so that light L emitted by the LEDs 2, positioned in the recess 30, enters the light entry opening of the collimator 4 or beam limiter 4 to exit entirely through its light exit opening. In this diagram, an apron 40 of the collimator 4 can clearly be seen, nested within the recess 30. This apron 40 is realised as an additional lower portion of the collimator 4, shaped so that it fits into a correspondingly shaped inside wall 31 of the recess 30. For the sake of simplicity, an actuator to move the collimator is not shown in this or in the following diagram.

Figure 2B:
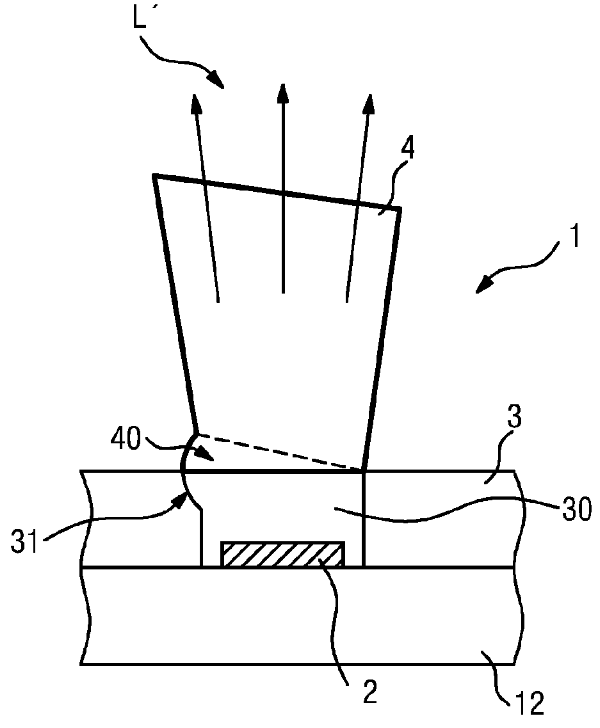
FIG. 2*b* shows a cross-section of the lighting assembly of FIG. 2*a*, in which the collimator is in a tilted position.

FIG. 2*b* shows the same lighting assembly of FIG. 2*a*. In this case, the collimator 4 is shown in its tilted position. As the diagram clearly shows, the collimator 4 has been tilted—in this diagram, to the right—whereby the apron 40 of collimator 4 has moved essentially upwards along the inside wall 31 of the recess 30. The collimator 4 shown in the diagram has been moved along its entire range of motion. Evidently the collimator 4 could be moved such that it is only moved within a part of its range of motion, for example so that it is only slightly tilted. Owing to the tilted position of the collimator 4, the overall direction of the output light L' has been altered accordingly. As can clearly be seen in the diagram, the particular design of the collimator 4 is such that, even when it is tilted, there is no loss of light from underneath the edges of the collimator 4 around its light entry opening. In this schematic or wire-frame diagram, the body of the collimator is not shown to have any thickness. Evidently, the side walls of the collimator will have a certain thickness, and these side walls may rest partially within the recess, even when the collimator is tilted. For the sake of clarity, this has not been indicated in the drawings.

Figure 3:
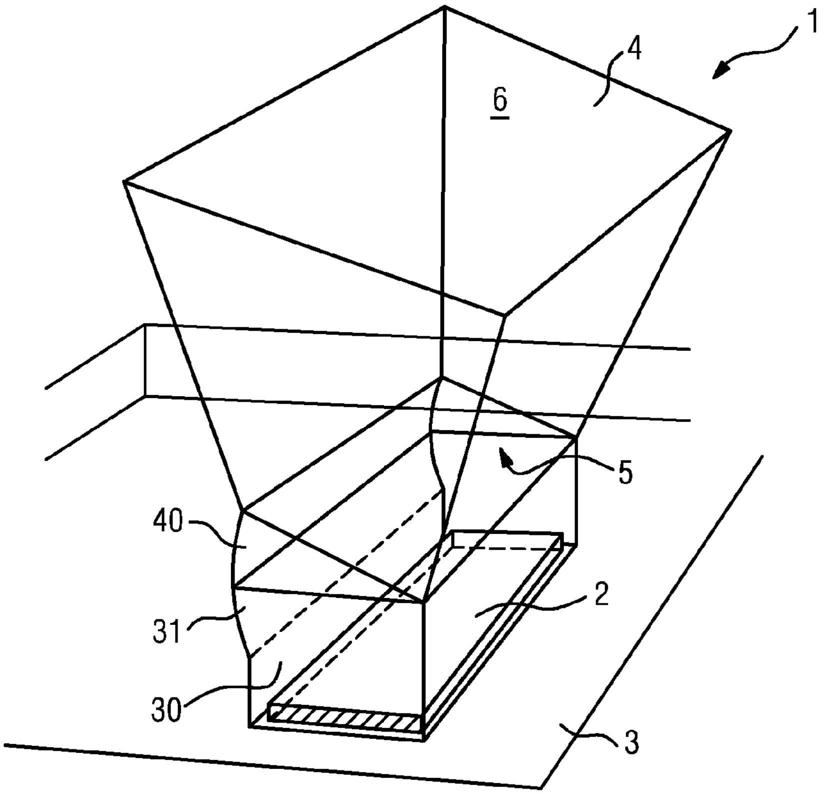
FIG. 3 shows an elevated side view of the lighting assembly according to the first embodiment of the invention.

FIG. 3 shows a detailed elevated side view of the lighting assembly 1 according to one embodiment of the invention. Again, the collimator 4 is shown in its tilted position. This diagram shows more clearly the shaped inside wall 31 of the recess 30 used in this embodiment, and the apron 40 of the collimator 4 which is shaped to complement the shape of the inside wall 31 of the recess 30. It can also be seen from the diagram that the light exit opening 6 of the collimator 4 is greater in area than the light entry opening 5, which essentially matches the area of the aperture 30 in the (partially indicated) cover 3 of the lighting assembly 1.

Figure 4:
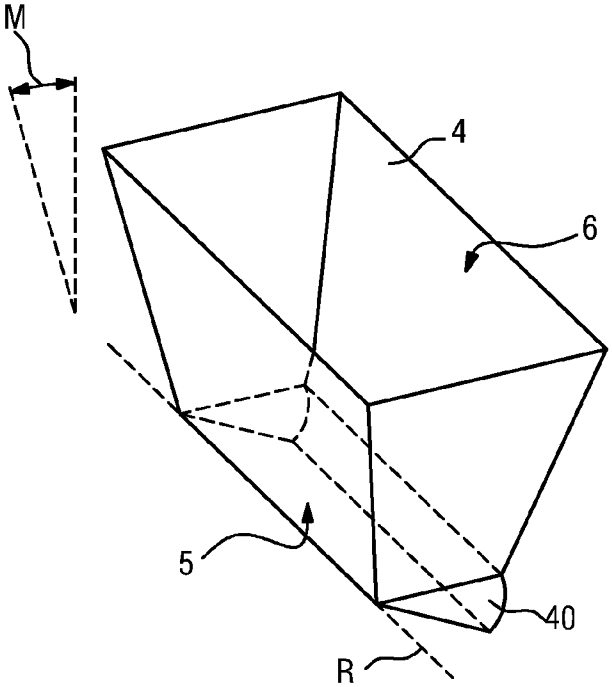
FIG. 4 shows an elevated side view of the lighting assembly of FIG. 3 with an axis of rotation.

FIG. 4 shows another elevated side view of the rectangular collimator 4 with apron 40. This diagram also indicates an axis of rotation R about which the collimator 4 in this embodiment can be moved or tilted over a range of motion M.

Figure 5:
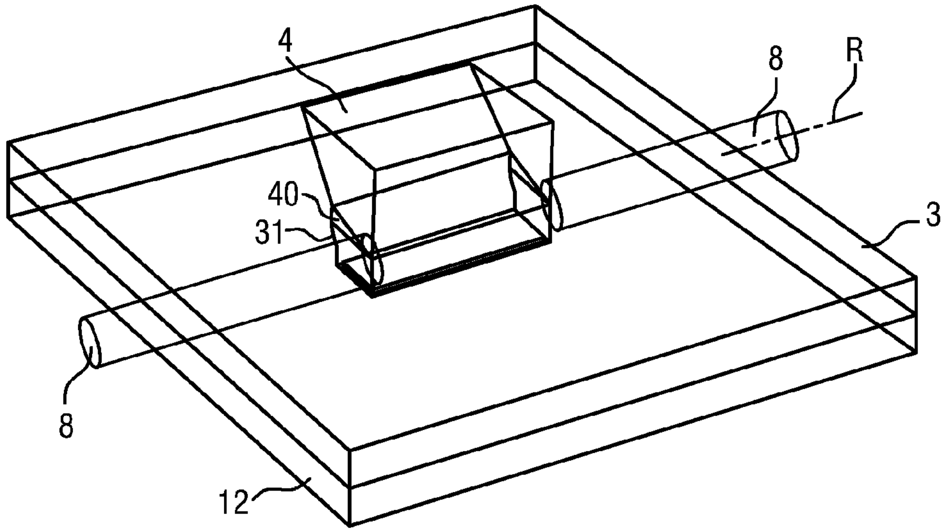
FIG. 5 shows a more detailed elevated side view of the lighting assembly of FIG. 4 with actuator.

FIG. 5 shows the collimator 4 of the first embodiment of the lighting assembly according to the invention, in this case with an actuator 8 realised to move or tilt the collimator 4 in order to change the bright/dark cut-off line and/or the preferred direction of light emission of the light L exiting the light exit opening 6. In this case the actuator 8 is simply a rod 8 which can be rotated by means, for example electro-mechanical means, not shown in the diagram. The rod 8 is attached or connected to the edge of the collimator 4 on the opposite side of the apron 41, so that the collimator 4 is tilted about an axis of rotation R.

Figure 6:
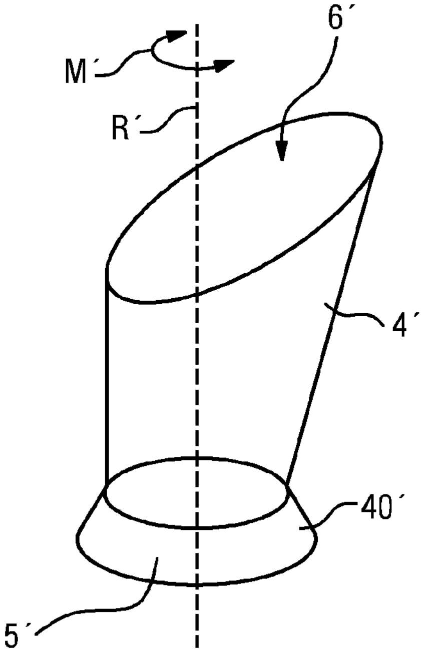
FIG. 6 shows an elevated view of a lighting assembly and actuator according to a second embodiment of the invention.

FIG. 6 shows an alternative realisation of a collimator 4' for use in a second embodiment of the lighting assembly according to the invention. In the diagram, the collimator 4' is shown as a truncated cone 4'. The geometry of the collimator 4' is such that the light entry opening 5' of the collimator 4' is circular in cross section, whereas the light exit opening 6' is elliptical in cross section. In this example, the collimator 4' is realised such that the light exit opening 6' is at an angle to the horizontal plane given by a support 3 of the lighting assembly 2, but the elliptical light exit opening 6' could equally be parallel to the plane of the support 3 of the lighting assembly. The light entry opening 5' of the collimator 4' is given by an apron 40' or flange 40' shaped to complement a corresponding inside wall or flange of a recess in or on the cover 3 of the lighting assembly.

Figure 7:
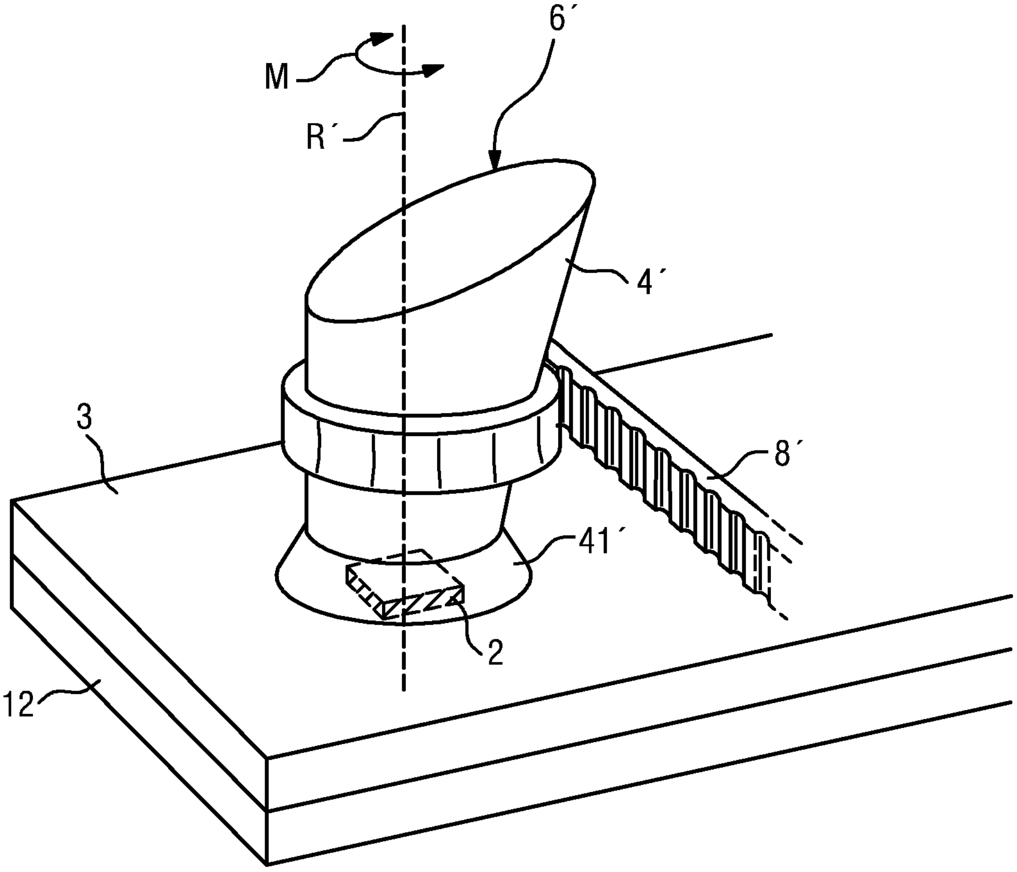
FIG. 7 shows an elevated view of the lighting assembly and actuator of FIG. 6.

FIG. 7 shows a realization of the cone-shaped collimator 4' with actuator 8'. The actuator 8' in this case is a toothed rod 8' whose teeth mesh with corresponding depressions in the outside surface of the collimator 4' so that, when the actuator 8' is moved sideways, the collimator 4' is caused to rotate by a corresponding amount M' about its axis of rotation R'.

Figure 8:
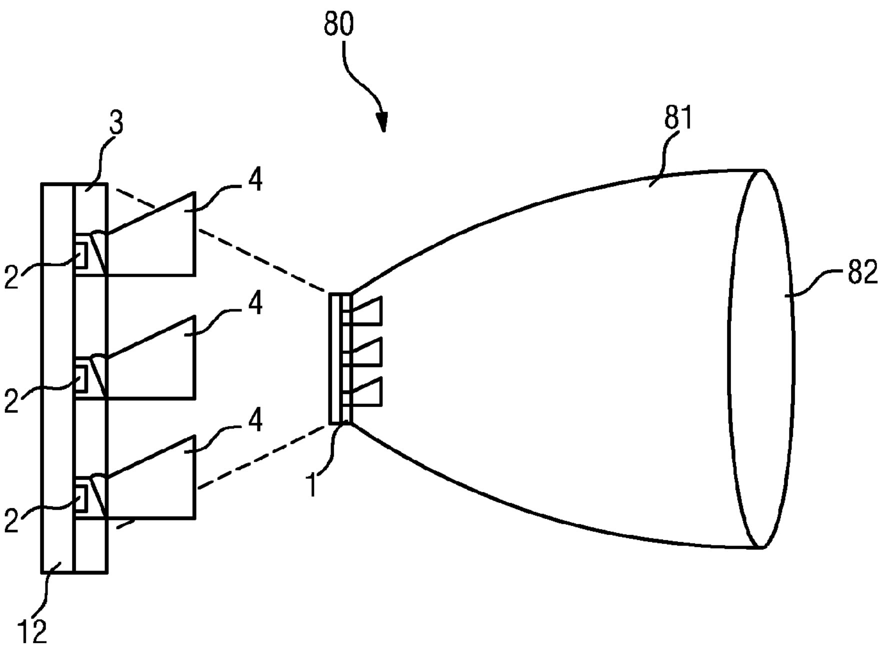
FIG. 8 shows a cross-section of an automotive headlamp arrangement comprising an array of lighting assemblies according to the invention.

FIG. 8 shows, in cross-section, a realization of an automotive headlamp arrangement 80 comprising a lighting assembly 1 according to the invention with an array of light sources 2, a support element 81, and a secondary optic 82. On the left-hand side of the diagram, the lighting arrangement 1 is shown enlarged for the sake of clarity. Here, an arrangement is shown having three rows of semiconductor light sources 2 in a support 3, each with a collimator 4 that can be tilted in the manner already described.

Figure 9:
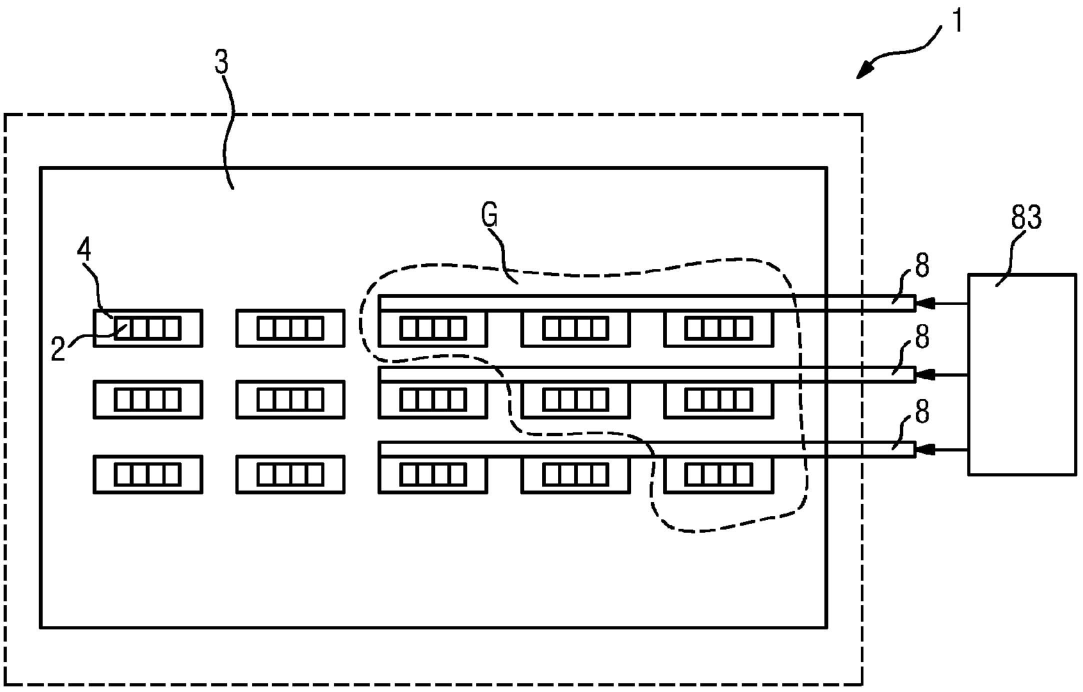
FIG. 9 shows a plan view of the array of lighting assemblies of the automotive headlamp arrangement of FIG. 8.

FIG. 9 shows a plan view of the lighting assembly 1 of the automotive headlamp arrangement 8 of FIG. 8, illustrating the choice of arrangement of the light sources in the lighting assembly. Here, for the sake of clarity, only a single semiconductor light source 2 and collimator 4 are indicated by reference numbers, however, it is to be understood that the array shown in the diagram comprises a plurality of such light sources and collimators. In the headlamp arrangement 8 shown in these diagrams, the shape of the output beam of light, i.e. the light pattern, is directly influenced by the arrangement of the lighting assemblies 1 within the array. The actuators 8 of a number of lighting assemblies 2 in a group G can be controlled electro-mechanically by a controller 83, such that the collimators 4 of the lighting assemblies 1 in the group G move synchronously. Evidently, such an automotive headlamp arrangement 8 can comprise more than one such group and more than one controller, so that actuators of each group are controlled independently of the actuators of the other group(s).

Although the present invention has been disclosed in the form of preferred embodiments and variations thereon, it will be understood that numerous additional modifications and variations could be made thereto without departing from the scope of the invention. For example, in the above, a motion of the collimator relative to the cover has been described. The embodiments have illustrated a collimator which can be moved, while the rest of the lighting assembly remains motionless. Naturally, a different approach could be taken in that the collimator remains essentially fixed, while other parts of the lighting assembly are caused to move. Furthermore, the cross-sectional shape of the recess, aperture and light entry/exit openings are not limited to the shapes described herein, but can take on any appropriate shape to suit the design of the lighting assembly.

For the sake of clarity, it is to be understood that the use of "a" or "an" throughout this application does not exclude a plurality, and "comprising" does not exclude other steps or elements. A "unit" or "module" can comprise a number of units or modules, unless otherwise stated.

The invention claimed is:

1. A lighting assembly comprising a semiconductor light source;

a support with a recess, within which recess the semiconductor light source is positioned;

a collimator comprising a light entry opening;

a light exit opening; and at least one side wall, wherein the collimator is moveable, relative to the support, within a range of motion about an axis of rotation, wherein the collimator is attached to the support such that the light entry opening of the collimator and the recess are joined in a nested manner so that light emitted by the semiconductor light source within the recess enters the collimator through the light entry opening and exits essentially only through the light exit opening of the collimator for any position of the collimator over the range of motion, wherein the recess and the light entry opening of the collimator comprises an essentially rectangular cross-section, and a collimator apron shaped to extend outwards along at least one edge of the light entry opening; and an actuator for moving the collimator about the axis of rotation, wherein the axis of rotation of the collimator is parallel to an edge of the light entry opening;

a collimator comprising:

a light entry opening;

an apron shaped to extend outwards along at least one edge of the light entry opening;

a light exit opening; and at least one side wall, wherein the collimator is moveable, relative to the support, within a range of motion about an axis of rotation, wherein the collimator is attached to the support such that the light entry opening of the collimator and the recess are joined in a nested manner so that light emitted by the semiconductor light source within the recess enters the collimator through the light entry opening and exits essentially only through the light exit opening of the collimator for any position of the collimator over the range of motion; and an actuator for moving the collimator about the axis of rotation, wherein the axis of rotation of the collimator is parallel to an edge of the recess;

wherein the actuator comprises a rod connected to the edge of the light entry opening opposite the apron, which rod is rotatable about the axis of rotation to tilt the collimator about the axis of rotation.

2. A lighting assembly according to claim 1, wherein the area of the light entry opening of the collimator is less than the area of the light exit opening of the collimator.

3. A lighting assembly according to claim 1, wherein the area of the light entry opening of the collimator is less than 120 $mm^2$.

4. A lighting assembly according to claim 1, wherein the inside surface of the recess is highly reflective.

5. A lighting assembly according to claim 1, wherein the recess comprises an opening in the support.

6. A lighting assembly according to claim 1, wherein the recess comprises an enclosure located on the surface of the support and extending outward from the surface of the support.

7. An automotive headlamp arrangement comprising a lighting assembly according to claim 1, and comprising a support element and a secondary optic.

8. A lighting assembly according to claim 1, wherein the area of the light entry opening of the collimator is less than 12 $mm^2$.

9. A lighting assembly according to claim 1, wherein the area of the light entry opening of the collimator is less than 6.75 $mm^2$.

10. A lighting assembly according to claim 1, wherein the apron is disposed around the light entry opening, and a corresponding wall of the recess is arranged to accommodate the apron such that the nested connection of the collimator and the recess is maintained during a movement of the collimator over its range of motion.

11. A lighting assembly according to claim 10, wherein the shape of the collimator apron and the shape of the corresponding surface of the recess comprise a curved shape, and the radius of curvature lies in a range between 0.4 and 4 mm.

12. A lighting assembly according to claim 10, wherein the shape of the collimator apron and the shape of the corresponding surface of the recess comprise a curved shape, and the radius of curvature lies in a range between 0.5 and 2 mm.

13. A lighting assembly according to claim 10, wherein the shape of the collimator apron and the shape of the corresponding surface of the recess comprise a curved shape, and the radius of curvature lies in a range between 0.7 and 1.5 mm.

14. A lighting assembly comprising:

a semiconductor light source;

a support with a recess, within which recess the semiconductor light source is positioned;

wherein the actuator comprises a rod connected to the edge of the light entry opening opposite the apron, which rod is rotatable about the axis of rotation to tilt the collimator about the axis of rotation.

* * * * *